United States Patent Office 3,634,397
Patented Jan. 11, 1972

1

3,634,397
COMPLETE SHORT-CHAIN ESTERS OF POLYOL MONO-(ACIDIC LIPID) ESTERS
James E. Thompson, Springfield Township, Hamilton County, and James B. Martin, Hamilton, Ohio, assignors to The Procter & Gamble Company, Cincinnati, Ohio
No Drawing. Filed May 16, 1969, Ser. No. 825,406
Int. Cl. C07c 69/32
U.S. Cl. 260—234 R         9 Claims

ABSTRACT OF THE DISCLOSURE

Novel complete short-chain esters of polyol mono-(acidic lipid) esters are useful as synthetic fats, especially for frying. Examples of the novel compounds include, 1,3-distearin glutaratyl-1-glycerol diacetate and 1,3-dipalmitin succinatyl-1-sorbitol pentabutyrate.

BACKGROUND OF THE INVENTION

This invention relates to a new class of high molecular weight, yet low melting or even liquid, synthetic fats. These synthetic fats are useful, for example, for frying purposes especially for frying chicken, fish, onion rings, and potatoes.

There is ordinarily difficulty in achieving the combination of physical and chemical properties considered desirable for a frying fat. On the one hand, it is considered desirable for the fat to be low melting or liquid under normal storage conditions. This is because if it is low melting, it can be used for frying purposes subsequent to the utilization of only a minimum amount of heat for purposes of melting. If it is liquid, it requires no melting and can be easily poured out of a bottle. On the other hand, it is considered to be desirable for a frying fat to be resistant to oxidation since such oxidation can cause the fat to be characterized by a dark color or bad odor, or bad taste, causing the consumer to discard the fat. So far as the triglyceride fats normally used for frying[1] are concerned, low melting or liquid triglyceride fats contain substantial unsaturation, and this unsaturation results in oxidation especially at frying temperatures in the presence of air. Thus, it is not possible to provide a triglyceride fat of the type normally used for frying which is both low melting or liquid, and at the same time is resistant to oxidation without the use of antioxidant additives. To be useful for frying, a synthetic fat which solves this problem, that is, which is both low melting or liquid and also oxidation resistant without the use of additives, should not smoke at ordinary frying temperatures, that is, over the range of 300° F. to 375° F., and preferably not even at temperatures as high as 400° F.

It is therefore an object of this invention to provide a novel synthetic fat which is low melting (that is, which melts at less than about 130° F.) or liquid at conditions normally encountered just previous to use, which is resistant to oxidation even at frying temperatures without the necessity of utilizing an antioxidant agent additive, and which does not smoke when exposed to frying temperatures of 300° to 375° F., that is, which have smoke points as described hereinafter greater than 375° F.

---
[1] These triglyceride fats are condensation products of glycerol with 3 molecules of fatty acids.

2

SUMMARY OF THE INVENTION

The above object is satisfied herein by the provision of novel complete short-chain esters of polyol mono-(acidic lipid) esters.

DETAILED DESCRIPTION OF THE INVENTION

The novel compounds herein have the structural formula:

$$\left[ R-\overset{O}{\underset{\|}{C}}- \right]_2 \left[ \begin{array}{c} -O-CH_2 \\ -O-CH \\ -O-CH_2 \end{array} \right] \left[ -\overset{O}{\underset{\|}{C}}(CH)_n\overset{O}{\underset{\|}{C}}- \right] [Y] \left[ -\overset{O}{\underset{\|}{C}}-R^2 \right]_q$$

In this structural formula, R is an alkyl group containing from 11 to 21 carbon atoms. Each one of the two R groups in a particular molecule can be the same or different.

In the above structural formula, $n$ is equal to 2 or 3.

In the above structural formula,

[Y] is (1) a linear polyol moiety having the structural formula $$\left[ \begin{array}{c} -O-CH_2 \\ (-O-CH)_m \\ -O-CH_2 \end{array} \right]$$

or (2) a sucrose moiety having the structural formula

[sucrose structural formula]

When Y is a linear polyol moiety, $m$ is equal to 1 to 4 and $q$ is equal to $m$ plus 1. When [Y] is a sucrose moiety, $q$ is equal to 7.

In the above structural formula for the new compounds herein, $R^2$ is an alkyl group containing from 1 to 3 carbon atoms. All the $R^2$ groups in a particular molecule are the same.

In the preferred compounds herein, R is an alkyl group containing 15 to 17 carbon atoms and each of the two R groups in a particular molecule is the same. Moreover, in the preferred compounds of this invention, [Y] is a linear polyol moiety with $m$ equal to 1 or 4 or a sucrose moiety with $q$ equal to 7, and each $R^2$ is an alkyl group containing one or 3 carbon atoms; and if [Y] is a linear polyol moiety, it is esterified at a primary hydroxyl.

The novel compounds herein have been described as complete short-chain esters of polyol mono-(acidic lipid) esters. In order to make this terminology clear, it is illustrated hereinafter by reference to the above-described structural formula. In the above-described structural formula, the polyol residue is [Y]. It is completely esterified. One of its ester groups is an acidic lipid, namely $$\left[ R-\overset{O}{\underset{\|}{C}}- \right]_2 \left[ \begin{array}{c} -O-CH_2 \\ -O-CH \\ -O-CH_2 \end{array} \right] \left[ -\overset{O}{\underset{\|}{C}}(CH)_n\overset{O}{\underset{\|}{C}}- \right]$$

The rest of the ester groups are short-chain esters and are represented in the above structural formula by $$\left[ -\overset{O}{\underset{\|}{C}}-R^2 \right]_q$$

In further illustration of the above structural formula and the terminology herein, the structural formula of a particular compound within the scope of this invention is given hereinafter, and particular chemical terminology is applied to its structural formula.

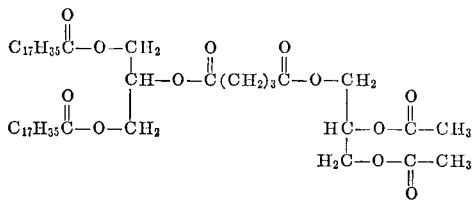

1,3-distearin glutaratyl-1-glycerol diacetate

In the above structure,

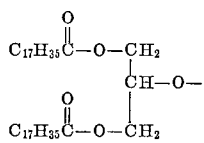

is a 1,3-distearin moiety;

is a glutaratyl moiety; and

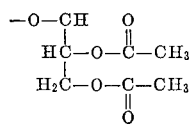

is a -1-glycerol diacetate moiety.

Compounds having the structural formula given above for the novel compounds of this invention wherein [Y] is a linear polyol moiety, $m$ is equal to 1, and $q$ is equal to 2, include, for example, 1,3-distearin glutaratyl-1-glycerol diacetate,
1,2-distearin succintayl-1-glycerol diacetate,
1,3-dipalmitate succinatyl-2-glycerol dipropionate,
1,2-dilaurin glutaratyl-2-glycerol dibutyrate,
1,3-dibehenin succinatyl-1-glycerol diacetate and
1-stearoyl-2-palmitoyl glycerol succinatyl-1-glycerol diacetate.

Compounds having the structural formula given above for the novel compounds of this invention wherein [Y] is a linear polyol moiety, $m$ is equal to 2 and $q$ is equal to 3, include, for example, 1,2-distearin succinatyl-1-erythritol triacetate,
1,3-distearin glutaratyl-2-erythritol tributyrate,
1,2-dimyristyl glutaratyl-2-erythritol tripropionate,
1-lauroyl-3-myristoyl succinatyl-1-erythritol triacetate, and
1,3-behenin glutaratyl-2-erythritol tributyrate.

Compounds having the structural formula given above for the novel compounds of this invention wherein [Y] is a linear polyol moiety, $m$ is equal to 3, and $q$ is equal to 4, include, for example, 1,2-distearin succinatyl-1-xylitol tetraacetate,
1,3-dipalmitin glutaratyl-2-xylitol tetrapropionate,
1,2-diarachidin succinatyl-3-xylitol tetrabutyrate,
1,2-dilaurin glutaratyl-2-xylitol tetraacetate, and
1-stearoyl-3 behenoyl glycerol succinatyl-3-xylitol tetrabutyrate.

Compounds having the structural formula given above for the novel compounds of this invention wherein [Y] is a linear polyol moiety, $m$ is equal to 4, and $q$ is equal to 5, include, for example, 1,3-dipalmitin succinatyl-1-sorbitol pentabutyrate,
1,3-distearin succinatyl-1-sorbitol pentabutyrate,
1,3-dipalmitin succinatyl-1-sorbitol pentaacetate,
1,3-distearin succinatyl-1-sorbitol pentaacetate,
1,2-distearin succinatyl-1-sorbitol pentaacetate,
1,2-dipalmitin succinatyl-1-sorbitol pentabutyrate,
1,3-dilaurin glutaratyl-2-sorbitol pentapropionate,
1,2-dimyristin succinatyl-3-sorbitol pentaacetate,
1,3-dibehenin succinatyl-1-sorbitol pentapropionate, and
1-palmitoyl-3-stearoyl glycerol glutaratyl-1-sorbitol pentabutyrate.

Compounds having the structural formula given above for the novel compounds of this invention wherein [Y] is a sucrose moiety and $q$ is equal to 7, include, for example, 1,3-distearin succinatyl sucrose heptaacetate, 1,3-distearin succinatyl sucrose heptabutyrate, 1,2-distearin succinatyl sucrose heptapropionate, 1,2-dipalmitin glutaratyl sucrose heptaacetate, 1,3-dilaurin succinatyl sucrose heptabutyrate and 1-behenoyl-2-stearoyl glycerol glutaratyl sucrose heptaacetate.

The compounds of this invention are conveniently prepared by completely esterifying polyol mono-(acidic lipid) esters with short-chain acid anhydrides or other suitable short-chain acylating agents. The polyol mono-(acidic lipid) esters are conveniently prepared as described in the copending patent application of James B. Martin entitled "Polyol Mono-(Acidic Lipid) Esters," Ser. No. 825,409, which was filed concurrently with the present patent application.

As stated above, the novel compounds herein are suitable for use as frying fats. For example, if the compounds herein are low melting solids they can be melted by the application of a small amount of heat thereto; and this melted synthetic fat can be placed, for example, in a frying pan or other frying apparatus for use in frying chicken, fish, onion rings, and potatoes. If the novel compound herein is a liquid at room temperature it can be conveniently poured from a bottle into a frying pan and used as described in the sentence previous hereto. When these novel compounds are used for frying purposes they do not oxidize since their carbon chains contain no unsaturated sites. Their color, good odor, and good taste is preserved to a significantly greater degree than in the case of conventional triglyceride fats. Moreover, the novel compounds herein do not smoke when exposed to normal frying conditions.

The following examples further illustrate the novel compounds herein, their preparation, and their use for frying or other purposes. Each of the novel compounds in these examples does not oxidize under typical frying conditions. Furthermore, they all have smoke points greater than about 375° F. indicating that they are suitable for frying under ordinary conditions. The smoke points herein are determined by heating the synthetic fat composition to the temperature of continuous smoking; the reported smoke point is the median temperature between the first intermittent smoke and the continuous smoking observed.

EXAMPLE I

Preparation of 1,3-distearin glutaratyl-1-glycerol diacetate [2]

A solution of 8.1 grams (0.1 mole) of distearin glutaratyl glycerol (predominantly 1,3-distearin glutaratyl-1-glycerol), 3.1 grams (0.03 mole) of acetic anhydride and 5 drops of perchloric acid in 65 milliliters of distilled (alcohol-free) chloroform is stirred at room temperature for two hours. The solution is poured into water, washed twice with water, and then dried over anhydrous magne-

---

[2] A compound having the structural formula in column 2 supra, wherein each R group contains 17 carbon atoms, $n$ is equal to 3, [Y] is a linear polyol moiety, $m$ is equal to 1, $q$ is equal to 2 and each R² group contains one carbon atom.

sium sulfate. Evaporation of the solvent gives a solid residue which is recrystallized twice from hexane to give 7.2 grams of product. Analysis shows this product to be substantially pure distearin glutaratyl glycerol diacetate. The predominant isomer in the product is 1,3-distearin glutaratyl-1-glycerol diacetate. The product is suitable for use for frying purposes; it does not oxidize under typical frying conditions, and it has a smoke point greater than 375° F.

1,2-dibehenin succinatyl-1-glycerol diacetate is the predominant isomer prepared when an equivalent amount of 1,2-dibehenin succinatyl-1-glycerol is substituted for the 1,3-distearin glutaratyl-1-glycerol in the above preparation. 1,2-dilaurin succinatyl-1-glycerol diacetate is the predominant isomer prepared when an equivalent amount of 1,2-dilaurin succinatyl-1-glycerol is substituted for the 1,3-distearin glutaratyl-1-glycerol in the above preparation. 1,3-distearin glutaratyl-1-glycerol dibutyrate is the predominant isomer prepared when an equivalent amount of butyric anhydride is substituted for the acetic anhydride in the above preparation. These short chain esters of polyol mono-(acidic lipid) esters are suitable for use for frying purposes; they are oxidation resistant and have smoke points greater than 375° F.

EXAMPLE II

Preparation of 1,3-dipalmitin succinatyl-1-sorbitol pentaacetate [3]

The procedure given in Example I is repeated with 4.2 grams (0.005 mole) of dipalmitin succinatyl sorbitol (predominantly 1,3-dipalmitin succinatyl-1-sorbitol), 10.3 grams (0.10 mole) of acetic anhydride and 2 drops of perchloric acid in 45 milliliters of chloroform. Recrystallization of the product from hexane at −7° C. gives 2.0 grams of dipalmitin succinatyl sorbitol pentaacetate. The product is deemed to be predominantly 1,3-dipalmitin succinatyl-1-sorbitol pentaacetate in admixture with minor amounts of the -2-sorbitol and -3-sorbitol isomers. The product has a melting point of 39.7–41°· C. It is suitable for use for frying purposes; it does not oxidize under typical frying conditions, and it has a smoke point greater than 375° F.

1,3-dilaurin glutaratyl-1-xylitol tetraacetate is the predominant isomer prepared when an equivalent amount of 1,3-dilaurin glutaratyl-1-xylitol is substituted for the dipalmitin succinatyl sorbitol in the above preparation. 1,3-dibehenin succinatyl-1-erythritol triacetate is the predominant isomer prepared when an equivalent amount of 1,3-dibehenin succinatyl-1-erythritol is substituted for the dipalmitin succinatyl sorbitol in the above preparation. These short chain esters of polyol mono-(acidic lipid) esters are suitable for use for frying purposes; they are oxidation resistant and have smoke points greater than 375° F.

EXAMPLE III

Preparation of 1,3-distearin succinatyl-1-sorbitol pentaacetate [4]

The acetylation of 4.4 grams (0.005 mole) of distearin succinatyl sorbitol (predominantly 1,3-distearin succinatyl-1-sorbitol) is accomplished with 10.3 grams (0.10 mole) of acetic anhydride and two drops of perchloric acid in 75 milliliters of chloroform solvent. The procedure is the same as in Example I. Recrystallization of the product from hexane at −7° C. gives 3.6 grams of distearin succinatyl sorbitol pentaacetate. The predominant isomer in the product is 1,3-distearin succinatyl-1-sorbinol pentaacetate. The product has a melting point of 47.0–47.6° C. It is suitable for use for frying purposes; it does not oxidize under typical frying conditions and it has a smoke point greater than 375° F.

1,3-distearin succinatyl-1-sorbitol pentapropionate is the predominant isomer prepared when an equivalent amount of propionic anhydride is substituted for the acetic anhydride above. This formed compound is suitable for use for frying purposes. It is oxidation resistant and has a smoke point greater than 375° F.

EXAMPLE IV

Preparation of 1,3-dipalmitin succinatyl-1-sorbitol pentabutyrate [5]

4.2 grams (0.005 mole) dipalmitin succinatyl sorbitol (predominantly 1,3-dipalmitin succinatyl-1-sorbitol) is butyrylated with 15.8 grams (0.10 mole) of butyric anhydride in the presence of perchloric acid. The reaction is carried out in chloroform solvent according to the general procedure described in Example I. Recrystallization of the product from hexane gives 1 gram of dipalmitin succinatyl sorbitol pentabutyrate. The predominant isomer in the product is 1,3-dipalmitin succinatyl-1-sorbitol pentabutyrate. The product is a semisolid at room temperature. It is suitable for use for frying purposes; it does not oxidize under typical frying conditions and it has a smoke point of 400°–405° F. It is suitable for use as a lubricant for food machinery or other machinery.

1,2-dimyristyl glutaratyl-1-sorbitol pentabutyrate is the predominant isomer prepared when an equivalent amount of 1,2-dimyristyl glutaratyl-1-sorbitol is substituted for the dipalmitin succinatyl sorbitol above. 1,3-dibehenin succinatyl-1-sorbitol pentabutyrate is the predominant isomer prepared when an equivalent amount of 1,3-dibehenin succinatyl-1-sorbitol is substituted for the dipalmitin succinatyl sorbitol above. The formed esters are suitable for use for frying purposes. They are oxidation resistant and have a smoke point greater than 375° F.

EXAMPLE V

Preparation of 1,3-distearin succinatyl sucrose pentabutyrate [6]

Distearin succinatyl sorbitol pentabutyrate (predominantly 1,3-distearin succinatyl-1-sorbitol pentabutyrate) is prepared from 4.4 grams (0.005 mole) of distearin succinatyl sorbitol (predominantly 1,3-distearin succinatyl-1-sorbitol), 15.8 grams (0.10 mole) of butyric anhydride and two drops of perchloric acid in 50 milliliters of chloroform in a manner similar to that described in Example I. The product is recovered by recrystallization from hexane at −18° C. The product has a melting point of 33.0–35.0° C. It is suitable for use for frying purposes; it does not oxidize under typical frying conditions and it has a smoke point greater than 375° F.

EXAMPLE VI

Preparation of 1,3-distearin succinatyl sucrose heptaacetate [7]

In essentially the same manner as described in Example I, 5.2 grams (0.005 mole) of 1,3-distearin succinatyl sucrose is reacted with 10.2 grams (0.10 mole) of acetic anhydride and 2 drops of perchloric acid in 75 milliliters of chloroform. Recrystallization of the product from hexane at −7° C. gives 3.9 grams of 1,3-distearin succinatyl sucrose heptaacetate. The product has a melting point of 52.0–54.0° C. It is suitable for use for frying purposes; it does not oxidize under typical frying conditions and it has a smoke point greater than 375° F.

---

[3] A compound having the structural formula in column 2 supra wherein each R group contains 15 carbon atoms, $n$ is equal to 2, [Y] is a linear polyol moiety, $m$ is equal to 4, $q$ is equal to 5, and each $R^2$ group contains one carbon atom.

[4] A compound having the structural formula in column 2 supra wherein each R group contains 17 carbon atoms, $n$ is equal to 2, [Y] is a linear polyol moiety, $m$ is equal to 4, $q$ is equal to 5 and each $R^2$ group contains one carbon atom.

[5] A compound having the structural formula in column 2 supra wherein each R group contains 15 carbon atoms, $n$ is equal to 2, [Y] is a linear polyol moiety, $m$ is equal to 4, $q$ is equal to 5, and each $R^2$ group contains 3 carbon atoms.

[6] A compound having the structural formula in column 2 supra wherein each R group contains 17 carbon atoms, $n$ is equal to 2, [Y] is a linear polyol moiety, $m$ is equal to 4, $q$ is equal to 5, and each $R^2$ group contains 3 carbon atoms.

1,2-dilaurin glutaratyl sucrose heptaacetate is prepared when an equivalent amount of 1,2-dilaurin glutaratyl sucrose is substituted for the distearin succinatyl sucrose above. 1,2-dibehenin succinatyl sucrose heptaacetate is prepared when an equivalent amount of 1,2-dibehenin succinatyl sucrose is substituted for the distearin succinatyl sucrose above. 1,3-distearin succinatyl sucrose heptapropionate is prepared when an equivalent amount of propionic anhydride is substituted for the acetic anhydride above. The formed compounds are suitable for use for frying. They are oxidation resistant and have smoke points greater than 375° F.

EXAMPLE VII

Preparation of 1,3-distearin succinatyl sucrose heptabutyrate [8]

The butyrylation of 4.8 grams (0.0045 mole) of 1,3-distearin succinatyl sucrose is carried out by the method of Example I with 15.8 grams (0.10 mole) of butyric anhydride and two drops of perchloric acid in 75 milliliters of chloroform. The product, 1,3-distearin succinatyl sucrose heptabutyrate, is purified by recrystallization from hexane at −18° C. The product has a melting point of 35.5–36.5° C. It is suitable for use for frying purposes; it does not oxidize under typical frying conditions, and it has a smoke point greater than 375° F.

---

[7] A compound having the structural formula in column 2 supra wherein each R group contains 17 carbon atoms, $n$ is equal to 2, [Y] is a sucrose moiety, $q$ is equal to 7, and each $R^2$ group contains one carbon atom.

[8] A compound having the structural formula in column 2 supra wherein each R group contains 17 carbon atoms, $n$ is equal to 2, [Y] is a sucrose moiety, $q$ is equal to 7, and each $R^2$ group contains 3 carbon atoms.

What is claimed is:

1. Esters of polyol mono-(acidic lipid) esters, said compounds having the structural formula $$\left[ R-\overset{O}{\underset{\parallel}{C}}- \right]_2 \left[ \begin{array}{c} O-CH_2 \\ -C-CH \\ -O-CH_2 \end{array} \right] \left[ -\overset{O}{\underset{\parallel}{C}}(CH)_n\overset{O}{\underset{\parallel}{C}}- \right] [Y] \left[ -\overset{O}{\underset{\parallel}{C}}-R^2 \right]_q$$

wherein (a) R is an alkyl group containing from 11 to 21 carbon atoms;
(b) $n$ is equal to 2 or 3;
(c) [Y] is either
  (i) a linear polyol moiety having the structural formula $$\left[ \begin{array}{c} -O-CH_2 \\ (-O-CH)_m \\ -O-CH_2 \end{array} \right]$$

or (ii) a sucrose moiety having the structural formula

[sucrose structural formula]

(d) when [Y] is a linear polyol moiety, $m$ is equal to 1 to 4 and $q$ is equal to $m$ plus 1; and when [Y] is a sucrose moiety, $q$ is equal to 7; and
(e) $R^2$ is an alkyl group containing from 1 to 3 carbon atoms.

2. The ester of polyol mono-(acidic lipid) ester of claim 1 wherein R is an alkyl group containing 15 to 17 carbon atoms.

3. The ester of polyol mono-(acidic lipid) ester of claim 2 wherein [Y] is a linear polyol moiety with $m$ equal to 1 or 4 or a sucrose moiety with $q$ equal to 7; and if [Y] is a linear polyol moiety, the acidic lipid ester group is esterified at a primary hydroxyl.

4. The ester of polyol mono-(acidic lipid) ester of claim 3 wherein each $R^2$ is an alkyl group containing one or 3 carbon atoms.

5. The ester of polyol mono-(acidic lipid) ester of claim 4 wherein each R group contains 15 carbon atoms, $n$ is equal to 2, [Y] is a linear polyol moiety, $m$ is equal to 4, $q$ is equal to 5 and each $R^2$ group contains 3 carbon atoms.

6. The ester of polyol mono-(acidic lipid) ester of claim 4 wherein each R group contains 17 carbon atoms, $n$ is equal to 2, [Y] is a linear polyol moiety, $m$ is equal to 4, $q$ is equal to 5, and each $R^2$ group contains one carbon atom.

7. The ester of polyol mono-(acidic lipid) ester of claim 4 wherein each R group contains 17 carbon atoms, $n$ is equal to 3, [Y] is a linear polyol moiety, $m$ is equal to 1, $q$ is equal to 2, and each $R^2$ group contains one carbon atom.

8. The ester of polyol mono-(acidic lipid) ester of claim 4 wherein each R group contains 17 carbon atoms, $n$ is equal to 2, [Y] is a sucrose moiety, $q$ is equal to 7, and each $R^2$ group contains one carbon atom.

9. The ester of polyol mono-(acidic lipid) ester of claim 4 wherein each R group contains 17 carbon atoms, $n$ is equal to 2, [Y] is a sucrose moiety, $q$ is equal to 7, and each $R^2$ group contains 3 carbon atoms.

References Cited

UNITED STATES PATENTS 2,927,919   3/1960   Anderson _____ 260—234
3,459,733   8/1969   Byrd, Jr., et al. _____ 260—234

LEWIS GOTTS, Primary Examiner

J. R. BROWN, Assistant Examiner

U.S. Cl. X.R.

99—1, 118 G; 260—404.8, 410.7

PO-1050
(5/69)

UNITED STATES PATENT OFFICE
CERTIFICATE OF CORRECTION

Patent No. 3,634,397          Dated January 11, 1972

Inventor(s) James E. Thompson and James B. Martin

It is certified that error appears in the above-identified patent and that said Letters Patent are hereby corrected as shown below:

Column 2, line 11, "$[-\overset{O}{\overset{\|}{C}}(CH)_n\overset{O}{\overset{\|}{C}}-]$" should read

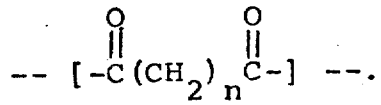

Column 2, line 60, "$[-\overset{O}{\overset{\|}{C}}(CH)_n\overset{O}{\overset{\|}{C}}-]$" should read

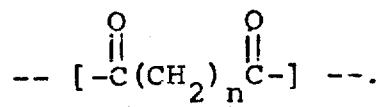

Column 5, line 68, "succinatyl-1-sorbinol" should read
-- succinatyl-1-sorbitol --.

Column 7, line 45, "$[-\overset{O}{\overset{\|}{C}}(CH)_n\overset{O}{\overset{\|}{C}}-]$" should read

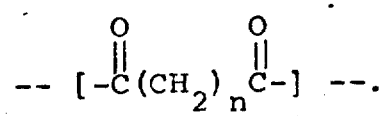

Signed and sealed this 25th day of July 1972.

(SEAL)
Attest:

EDWARD M. FLETCHER, JR.      ROBERT GOTTSCHALK
Attesting Officer             Commissioner of Patents